United States Patent Office 3,634,470
Patented Jan. 11, 1972

3,634,470
DIHYDROCHLORIDES OF FARNESYLIC ACID ESTERS
Miroslav Romanuk, Karel Slama, and Frantisek Sorm, Prague, Czechoslovakia, assignors to Ceskoslovenska Akademie Ved, Prague, Czechoslovakia
No Drawing. Filed June 15, 1967, Ser. No. 646,204
Claims priority, application Czechoslovakia, Aug. 19, 1966, 5,464/66
Int. Cl. C11c 3/00
U.S. Cl. 260—408        8 Claims

ABSTRACT OF THE DISCLOSURE

Dihydrochlorides of farnesylic acid esters of the general formula

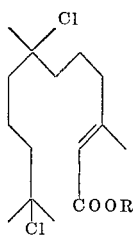

wherein R is selected from the group consisting of alkyl having 1 to 15 carbon atoms, aralkyl having 7 to 12 carbon atoms and cycloalkyl having 1 to 10 carbon atoms. The compounds are synthetic juvenile hormones by which the development and reproduction, for instance, of insects can be controlled. A representative example is methyl farnesylate dihydrochloride.

To make the compounds the ester (farnesylate) is just formed by esterifying farnesylic acid. The dihydrochlorides are then formed by subjecting the ester to the action of hydrogen chloride preferably in an alcoholic solution where the alcohol is the same as that from which the ester is formed.

BACKGROUND OF THE INVENTION

Juvenile hormones are hormones which prevent maturing of insects. They can therefore be used for controlling or destroying insect pests by preventing the insects from reaching a reproductive stage.

It is known that certain lipidic extracts of insects containing the naturally occurring esters of high fatty acids wherein there is no aromatic nucleus and which are non-volatile when exposed to steam have an activity similar to that of juvenile hormones. This type of effect has also been found in lipidic extracts of other types of animals and in extracts from various organs of vertebrates.

In the course of an investigation of secretes of *Tenebrio molitor* it was furthermore found that the active compound responsible for the juvenile hormone activity was the sesquiterpenic farnesol alcohol having the following Formula I:

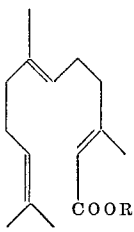

(I)

A study of farnesol derivatives also showed juvenile hormone activity to be present in farnesyldiethylamine and farnesyl methyl ether. The latter would have a formula as in Formula I above except that R represents a methyl residue.

Furthermore, farnesyl acetone, farnesyl acetate, difarnesyl ether, farnesylmercaptan and farnesylmethylamine show an activity similar to that of farnesol whereas dodecyl methyl ether is approximately as active as farnesyl methyl ether. A marked juvenile hormone activity is also shown by compounds contained in the wood of *Abies balsamea* and a few other trees.

There have also been efforts to produce compounds of a pronounced juvenile hormone activity by chemical synthesis. Thus it has been proposed to the subject free farnesylic acid to the action of gaseous hydrogen chloride. The acid has a structural formula as appears from the following Formula II: (R being H).

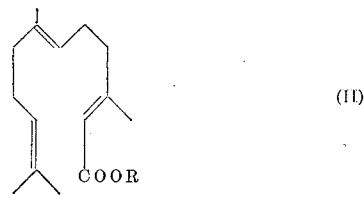

(II)

However, attempts to isolate a specific chemical compound from the reaction product or to determine at least the chemical nature of the active component proved fruitless. This line of experiments resulted only in a mixture of compounds of an unknown composition.

SUMMARY OF THE INVENTION

It is therefore an object of the present invention to obtain synthetic compounds of a chemically definite composition and possessing marked juvenile properties.

It is a further object of the invention to obtain compounds of this type which are derived from farnesol or farnesylic acid.

The compounds which meet these objects are

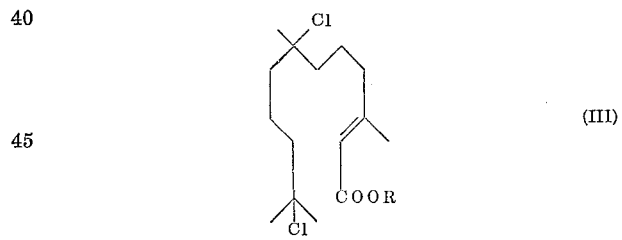

(III)

wherein R is selected from the group consisting of alkyl having 1 to 15 carbon atoms, aralkyl having 7 to 12 carbon atoms and cycloalkyl having 3 to 10 carbon atoms.

The compounds of the invention have a high activity as juvenile hormones. They are in particular distinguished by the fact that after contact with the ovum of the female insect they inhibit evolution of the embryo and thus prevent the insect from reaching the larvae stage.

As against the prior art they represent chemical compounds the structure and composition of which has been determined in a definitive way. These compounds therefore have the desirable features of pure compounds in that, as against the undefined mixture, they possess a higher activity and are also capable of specific action against certain species of insects.

The invention also embraces the non-chlorinated esters used in making the dihydrochlorides.

The method of making the compounds involves making the ester from farnesylic acid and subjecting the ester to the action of hydrogen chloride to form the dihydrochloride of Formula III. The reaction is preferably carried out in an alcoholic solution with the same alcohol

DESCRIPTION OF THE PREFERRED EMBODIMENTS

As has been pointed out the compounds of the invention are the dihydrochlorides of farnesylic acid esters of the general Formula III above given. R may, for instance, be methyl, ethyl, isopropyl, tert.butyl, 2-ethylhexyl, decyl, farnesyl, cyclopropyl, cyclohexyl, bornyl, benzyl, α- and β-phenylethyl, α- and β-naphthylmethyl, and benzhydryl. Preferred are the methyl, benzyl and cyclohexyl farnesylate dihydrochlorides.

The reaction proceeds from the non-chlorinated esters. These esters according to the invention are prepared by reacting farnesylic acid with an esterifying agent. For instance, in order to form the methyl ester the acid may be reacted with diazomethane. In order to form the benzyl ester silver salt of the acid is reacted with benzyl-bromide and for the cyclohexyl ester suitably cyclohexyliodide is used.

Normally the reaction is effected in a solution with an organic solvent which should be stable against hydrogen chloride and should be of a type not to interfere with the formation of the dihydrochloride of the desired ester. Examples of solvents are diethyl ether, chloroform, carbon tetrachloride, ethyl acetate, benzene or a mixture of one or more of these solvents. For reasons of economy and technical performance an alcoholic solution is preferred and in particular a solution in the same alcohol as used in the formation of the ester. For instance aliphatic alcohols may be used, such as methanol, or a cyclic alcohol, such as cyclohexanol (prepared by hydrogenation of phenols), or aralkyl alcohols, such as benzyl alcohol. The esterification may otherwise be performed in the conventional manner provided that undesired by-products are avoided and satisfactory yields are obtained. Thus one can use diazoalkanes or can use the alcohol in the presence of dicyclohexylcarbodiimide or one may use an azeotropic esterification reaction.

The amount of hydrogen chloride will depend on the ester dissolved, for instance, in the alcohol. At least 2 moles of hydrogen chloride should be necessary. The maximum hydrogen chloride concentration in an alcohol solvent is 40 to 50%. The preferred concentration is in the range between a 20% solution of hydrogen chloride and a saturated solution. The following shows the maximum content of hydrogen chloride in some of the organic solvents at 0° C.:

2–5% (w./w.) in pure anhydrous benzene
30–35% (w./w.) in pure anhydrous ether
2–5% (w./w.) in pure anhydrous chloroform The reaction may be effected within a temperature range of from minus 30° C. to plus 30° C. The preferred temperature is between minus 5° C. and plus 5° C.

Pressures may be used in the range from 1 to 20 atmospheres. Normal pressure is most suitable but pressure above atmospheric may be used although it is not required.

The following examples will further illustrate the invention without any intention of limitation:

EXAMPLE 1

Preparation of methyl farnesylate (Formula II, wherein R represents a methyl group)

A solution of crude farnesylic acid (2 g.) in anhydrous ether (30 ml.) was treated dropwise at 20° C. with a moderate excess of ethereal diazomethane. The resulting mixture was allowed to stand for 15 minutes and the excess diazomethane was evaporated under atmospheric pressure along with the solvent. The crude residual ester (2.17 g.) was diluted with light petroleum (B.P. 40–60° C.) and purified by chromatography on a column of silica gel (particle size 30–60 microns) using a 9:1 light petroleum-ether mixture for elution. Yield, 1.71 g. of the pure methyl ester, B.P. 72° C./0.1 mm. Hg: $n_D^{17}$ 1.4858. Infrared spectrum: 1155, 1650, 1715 cm.$^{-1}$. For $C_{16}H_{26}O_2$ (250.4) calculated (percent): 76.75 C, 10.47 H; found (percent): 76.84 C, 10.21 H.

EXAMPLE 2

Preparation of benzyl farnesylate (Formula II, wherein R represents a benzyl residue)

A suspension of dry silver farnesylate (700 mg.) in anhydrous ether (20 ml.) was treated dropwise, during 5 minutes and upon stirring, with 340 mg. freshly distilled benzyl bromide. The resulting mixture was refluxed for 3 hours and filtered through a column of diatomaceous earth (2 g.). The precipitate was washed with ether (10 ml.) and the combined ethereal filtrates were evaporated at atmospheric pressure. The residual crude ester (715 mg.) was diluted with 1 ml. of light petroleum (B.P. 40–60° C.) and chromatographed on a column of silica gel (50 g.; particle size 30–60 microns) deactivated by the addition of 10% of water. Elution with a 9:1 light petroleum-ether solvent mixture afforded pure benzyl farnesylate which was redistilled under reduced pressure. Yield, 310 mg. of benzyl farnesylate, a clear viscous liquid, B.P. 160° C. at 0.1 mm. Hg: $n_D^{18}$ 1.5245. Infrared spectrum: 1140, 1500, 1645, 1720 cm.$^{-1}$.

EXAMPLE 3

Preparation of cyclohexyl farnesylate (Formula II, wherein R represents a cyclohexyl residue)

Dry silver farnesylate (700 mg.) was mixed at 20° C. with cyclohexyl iodide (600 mg.) by grinding. The mixture, which got warm spontaneously and attained a yellow color by the precipitation of silver iodide, was allowed to stand for one hour, diluted with dry n-hexane (20 ml.) and kept at room temperature for an additional hour. The precipitate was filtered off through a column of diatomaceous earth (2 g.) and washed with n-hexane (10 ml.). The combined filtrates were concentrated at atmospheric pressure/to one-tenth of the original volume and the concentrate chromatographed on a column of silica gel (80 g.; particle size 30–60 microns) deactivated by the addition of 10% (by weight) of water. Elution with a 9:1 light petroleum-ether mixture yielded the pure cyclohexyl ester which was redistilled under reduced pressure. Yield, 95 mg. of a clear viscous liquid, B.P. 145° C./0.1 mm. Hg; $n_D^{19}$ 1.5002. Infrared spectrum: 1155, 1650, 1715 cm.$^{-1}$. For $C_{21}H_{34}O_2$ (318.5) calculated (percent): 79.19 C, 10.76 H. Found (percent): 79.57 C, 10.52 H.

EXAMPLE 4

Preparation of benzyl farnesylate dihydrochloride (Formula III, wherein R represents benzyl)

Dry gaseous hydrogen chloride was introduced at 25–30° C. into 10 ml. of tert-butyl alcohol for the period of one minute. The solution was then cooled down in ice water to 0° C.–+5° C. and treated with benzyl farnesylate (200 mg.). Hydrogen chloride was introduced as soon as the ester dissolved and the introduction was continued at 0° C.–+5° C. till the reaction mixture was saturated (after about 5 minutes). The mixture was then allowed to remain at 0° C. for 15 minutes and was concentrated at 100–20 mm. Hg and a temperature between 0° C. and +30° C. to half of its original volume in order to remove excess hydrogen chloride. The residue was diluted with 20 ml. of ice water and extracted with three 15-ml. portions of light petroleum (B.P. 40–60° C.). The combined extracts were washed with aqueous sodium hydrogen carbonate and water, dried over anhydrous sodium sulfate and evaporated at atmospheric pressure. The residual solvent was removed under reduced pressure (20 mm. Hg). The residual product, benzyl farnesylate dihydrochloride, was purified by chromatography on a thin layer (0.5 mm.) of silica gel with gyps (Kieselgel G Merck) in the solvent mixture of a 9:1 light petroleum-ether. The band of the pure product was eluted with ether. The eluate was evaporated and the residue distilled to give 135 mg. of a clear, colorless, viscous liquid which was dried at 40° C./0.1 mm. Hg for two hours to remove the last traces of the solvent and moisture; $n_D^{17}$ 1.5213. Infrared spectrum: 1145, 1500, 1650, 1720 cm.$^{-1}$. For $C_{22}H_{32}O_2Cl_2$ (399.5) calculated: 17.77% Cl. Found: 16.91% Cl.

EXAMPLE 5

Preparation of cyclohexyl farnesylate dihydrochloride (Formula III, wherein R represents a cyclohexyl residue)

This compound was obtained in the same manner as the benzyl farnesylate dihydrochloride in Example 4. Thus, 80 mg. of cyclohexyl farnesylate (Formula II, wherein R represents a cyclohexyl residue) yielded 85 mg. of a crude dihydrochloride which was purified on a thin layer (0.5 mm.) of silica gel with gyps (Kieselgel G Merck) to yield 60 mg. of the pure cyclohexyl farnesylate dihydrochloride; $n_D^{18}$ 1.4905. Infrared spectrum: 1155, 1655, 1720 cm.$^{-1}$. For $C_{21}H_{36}O_2Cl_2$ (391.5) calculated: 18.11% Cl. Found: 17.60% Cl.

EXAMPLE 6

Preparation of methyl farnesylate dihydrochloride (methyl 3,7,11-trimethyl-7,11-dichloro-2-dodecenoate) (Formula III, wherein R represents a methyl group)

A solution of methyl farnesylate (1.0 g.) in methanol (30 ml.) was saturated at 0° C. to +5° C. with dry gaseous hydrogen chloride which was introduced for about 15 minutes. The reaction mixture was then allowed to stand at 0° C. for 10 minutes and concentrated at +5° C. to +20° C./100–20 mm. Hg to half of its original volume in order to remove excess hydrogen chloride. The residue was diluted with 40 ml. of ice water and extracted with three 15-ml. portions of light petroleum. The combined extracts were washed with aqueous sodium hydrogen carbonate and water, dried over anhydrous sodium sulfate, evaporated at atmospheric pressure (yield, 1.20 g. of the crude residue) and the residue (200 mg.) was purified by chromatography on a thin layer (0.5 mm.) of silica gel with gyps (Kieselgel G Merck) in the solvent mixture of a 9:1 light petroleum-ether. The bands containing the product were eluted with ether and the eluates were evaporated to yield 145 mg. of a clear, colorless, viscous liquid; $d_4^{21}$ 0.9408, $n_D^{21}$ 1.4849. Infrared spectrum: 1155, 1650, 1715 cm.$^{-1}$. For $C_{16}H_{28}O_2Cl_2$ (323.3) calculated: 21.93% Cl. Found: 21.66% Cl. The existence of an unchanged farnesane system in the resulting methyl farnesylate dihydrochloride was established by reduction (in three steps) of the dihydrochloride to yield hexahydrofarnesol (Formula IV).

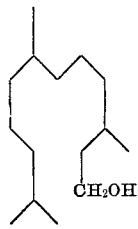

(IV)

The following Examples—7 to 9—illustrate other manners of making the methyl farnesylate dihydrochloride:

EXAMPLE 7

Hydrogen chloride was introduced at 0° C. and at ordinary pressure into a solution of 100 mg. of methyl farnesylate (Formula II, wherein R represents a methyl group) in 3 ml. of pure anhydrous benzene. After saturation with hydrogen chloride, the mixture was allowed to stand at 0° C. for 10 minutes and then evaporated under diminished pressure (50 to 100 mm. Hg) to remove excess hydrogen chloride. The residue was diluted with 10 ml. of ice-cold water and extracted with two 10-ml. portions of light petroleum (B.P. 40–60° C.). The extracts were combined, washed successively with aqueous sodium carbonate and distilled water, dried over anhydrous sodium sulfate and evaporated. Yield: 115 mg. of a crude product containing 25% of methylfarnesylate dihydrochloride.

EXAMPLE 8

The same procedure was followed as in Example 7 except that for the solvent anhydrous pure diethyl ether was used instead of benzene. Yield: 110 mg. of a crude product containing 40% of methyl farnesylate dihydrochloride.

EXAMPLE 9

The procedure was again the same as in Example 7, but chloroform was used as the solvent. Yield: 115 mg. of a crude product containing 50% of methyl farnesylate dihydrochloride.

ACTIVITY TESTS

The juvenile hormone activity was tested on larvae of the last instar of Pyrrhocoris apterus as follows. The compound of the invention was dissolved in 1 microliter of acetone and the solution was applied on the surface of the insect. The activity was estimated according to the degree of preservation of larval structures. Formation of normal adult forms (imago) was designated as O, formation of transitional forms between larvae and imagos was designated as I to IV, and the formation of larvae (instead of imagos), i.e., a larval development instead of a metamorphosis was designated by the symbol V. The results are summarized in the following table.

| Compound | Amount of the active compound applied to the insect (in micrograms) | | | | | |
|---|---|---|---|---|---|---|
| | 0.001 | 0.01 | 0.1 | 1.0 | 10.0 | 100.0 |
| Farnesol (Formula 1, R=H) | 0 | 0 | 0 | 0 | 0 | 0–I |
| Farnesyl methyl ether (Formula I, R=CH₃) | 0 | 0 | 0 | 0 | 0–I | II–III |
| Methyl farnesylate (Formula II, R=CH₃) | 0 | 0 | 0 | 0 | III–IV | V |
| Methyl farnesylate dihydrochloride (Formula III, R=CH₃) | I–II | V | V | V | V | V |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. As a novel composition, a dihydrochloride of a farnesylic acid ester of the general formula

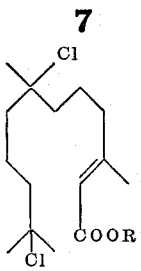

wherein R is selected from the group consisting of alkyl having 1 to 15 carbon atoms, aralkyl having 7 to 12 carbon atoms and cycloalkyl having 3 to 10 carbon atoms.

2. The compound of claim 1, wherein R is alkyl having 1 to 15 carbon atoms.

3. The compound of claim 1, wherein R is aralkyl having 7 to 12 carbon atoms.

4. The compound of claim 1, wherein R is cycloalkyl having 3 to 10 carbon atoms.

5. The compound of claim 1 which is methyl farnesylate dihydrochloride.

6. The compound of claim 1, which is benzyl farnesylate dihydrochloride.

7. The compound of claim 1, which is cyclohexyl farnesylate dihydrochloride.

8. A compound according to claim 1 wherein R is ethyl.

References Cited

UNITED STATES PATENTS 2,812,341  11/1957  Fareri et al. -------- 260—408
3,154,570  10/1964  Adami et al. ------ 260—410.5

OTHER REFERENCES

Law et al.: "Synthesis of a Material with High Juvenile Hormone Activity."
Proceedings of the National Academy of Sciences, vol. 55, No. 3, March 1966, pp. 576–578.

LEWIS GOTTS, Primary Examiner

C. L. MILLS, Assistant Examiner

U.S. Cl. X.R.

424—312